United States Patent
Watson et al.

(10) Patent No.: US 7,512,188 B1
(45) Date of Patent: Mar. 31, 2009

(54) PHASE SHIFT KEYING SIGNALING FOR INTEGRATED CIRCUITS

(75) Inventors: James A. Watson, Santa Clara, CA (US); Michael A. Margolese, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 1085 days.

(21) Appl. No.: 10/412,532

(22) Filed: Apr. 10, 2003

(51) Int. Cl.
   H04L 27/18 (2006.01)
   H04L 27/20 (2006.01)
   H03C 5/00 (2006.01)
   H03D 5/00 (2006.01)

(52) U.S. Cl. .............. 375/279; 375/268; 375/269; 375/308

(58) Field of Classification Search .......... 375/279, 375/297, 324, 347, 223, 303, 280, 329, 261, 375/308, 309, 228, 268, 269; 332/100; 341/110; 329/304
See application file for complete search history.

(56) References Cited

U.S. PATENT DOCUMENTS

| | | | | |
|---|---|---|---|---|
| 4,089,061 A | * | 5/1978 | Milewski | 708/305 |
| 4,575,858 A | * | 3/1986 | Dow | 375/280 |
| 4,639,679 A | * | 1/1987 | Kasperkovitz et al. | 327/122 |
| 4,780,884 A | * | 10/1988 | Karabinis | 375/261 |
| 5,260,975 A | * | 11/1993 | Saito | 375/327 |
| 5,565,817 A | * | 10/1996 | Lakshmikumar | 331/57 |
| 5,687,202 A | * | 11/1997 | Eitrheim | 375/376 |
| 5,796,673 A | * | 8/1998 | Foss et al. | 365/233 |
| 6,046,629 A | * | 4/2000 | Akiyama et al. | 329/304 |
| 6,130,577 A | * | 10/2000 | Tamba et al. | 329/304 |
| 6,437,713 B1 | * | 8/2002 | Lesea | 341/78 |
| 6,922,160 B1 | * | 7/2005 | Brown | 341/110 |
| 2001/0033630 A1 | * | 10/2001 | Hassoun et al. | 375/376 |
| 2002/0022938 A1 | * | 2/2002 | Butler | 702/85 |
| 2002/0172304 A1 | * | 11/2002 | Saze et al. | 375/340 |
| 2003/0052723 A1 | * | 3/2003 | Forbes | 327/295 |
| 2004/0028146 A1 | * | 2/2004 | Winkler | 375/260 |
| 2004/0130366 A1 | * | 7/2004 | Lin et al. | 327/158 |

OTHER PUBLICATIONS

Das, Amplitude-Frequency Shift Keying (AFSK), ), Oct. 16-20, 2000, International Conference on Signal Processing Applications & Technology.*

Anthony Cataldo; "Multilevel Signals Rise to Occasion"; EE Times; Mar. 27, 2003; downloaded on Apr. 9, 2003 from wysiwyg://73/http://www.eetimes.com/story/OEG20030327S0027; pp. 1-4.

* cited by examiner

Primary Examiner—Ghayour Mohammad
Assistant Examiner—Lawrence B Williams
(74) Attorney, Agent, or Firm—Kim Kenzaki; Robert M. Brush (57) ABSTRACT

The present invention relates to a system for communicating between two integrated circuits (ICs) or within an IC. The ICs are either on the same circuit boards or on different circuit boards with a common backplane. The system comprises a first integrated circuit having an output circuit for generating phase shift keying signals and a second integrated circuit having an input circuit for decoding the phase shift keying signals. The output circuit may include a ring oscillator for generating multiple clock signals that are phase-locked to one another.

18 Claims, 14 Drawing Sheets

PHASE SHIFT KEYING SIGNALING FOR INTEGRATED CIRCUITS

FIELD OF THE INVENTION

The present invention relates to integrated circuits, and more particularly to high speed communications between integrated circuits on a printed circuit board, between integrated circuits on different printed circuit boards having a common backplane, and between components in an integrated circuit.

BACKGROUND OF THE INVENTION

Figure 1:
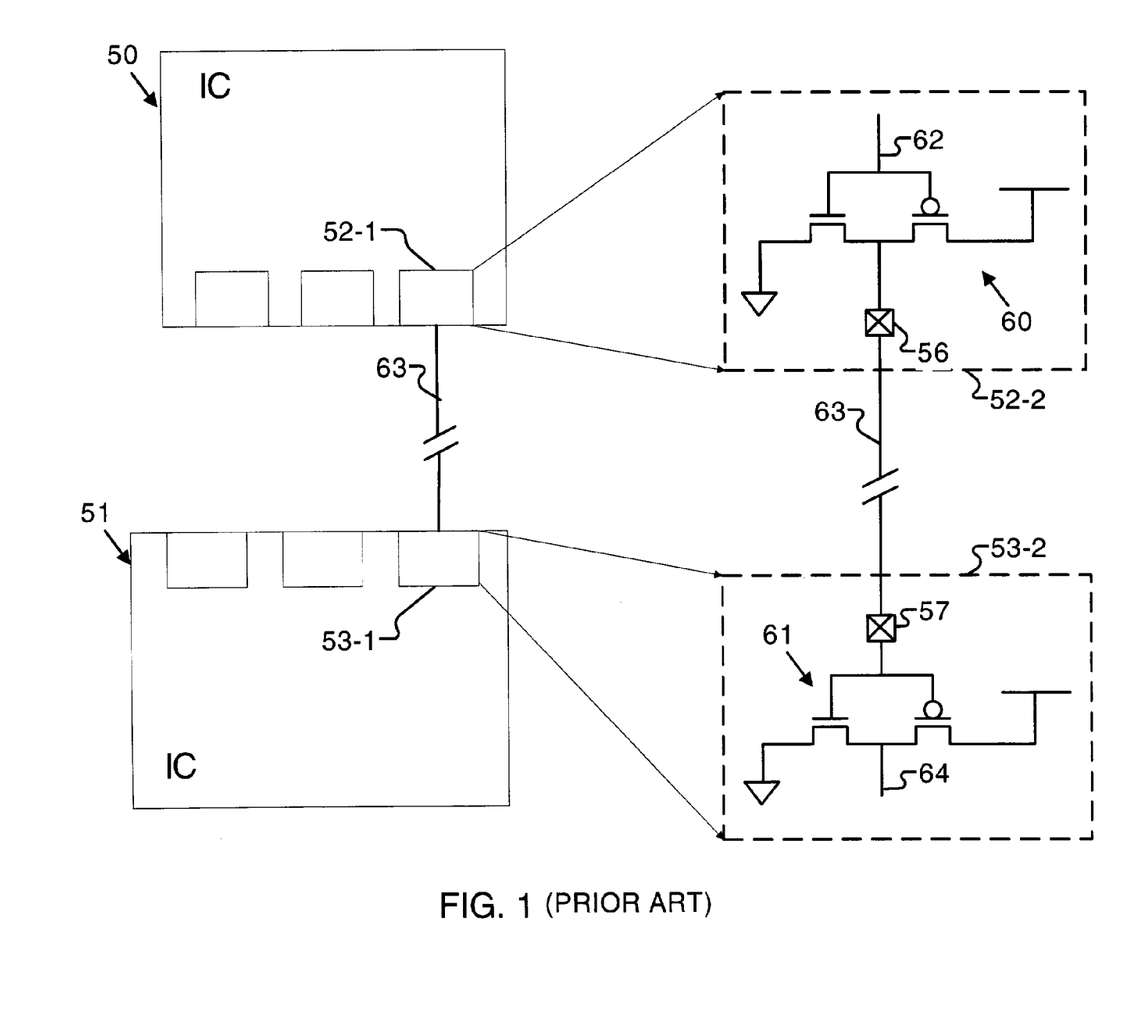
FIG. 1 shows a prior art IC communication system.

Communications between integrated circuits (ICs) on a printed circuit board (PCB) or between ICs on different PCBs with a common backplane has conventionally used digital signaling, e.g., a level-sensitive binary protocol. For example, logic 0 is normally represented by a low voltage level, while logic 1 is represented by a high voltage level. A simplified example of such a system is shown in FIG. 1. FIG. 1 shows two ICs, i.e., IC 50 and IC 51. A simplified input/output buffer in each IC is shown (e.g., buffers 52-1 and 53-1). Expanded buffer 52-2 represents buffer 52-1 of IC 50 and expanded buffer 53-2 represents buffer 53-1 of IC 51. In FIG. 1, pad 56 is attached to an output buffer, i.e., output driver 60, and pad 57 attached to an input buffer 61 (note on actual pad would be attached to both an input buffer and an output driver). Output driver 60 delivers to pad 56 a signal having a high or a low voltage level, depending on the logic state of an input line 62. Pads 56 and 57 are connected by a metal trace 63 on a PCB.

Ideally input line 62 would have a voltage square wave with one of two voltage levels, having the output data, i.e., the logic 1's and 0s' from IC 50. The output data would go via output driver 60 to pad 56 and then travel via trace 63 to pad 57. The output data from IC 50 would then be input data to IC 51. The input data is buffered by input buffer 61 and goes to the rest of the IC 51 circuitry via output line 64.

As the speed of communications increases, e.g., in the gigahertz (GHz) range and above, the user of square waves with the amplitude having the data, starts to have significant bit error rate problems. One reason is that signal degradation, e.g., amplitude degradation and continuous phase shift, occur as a signal travels down a transmission line, e.g., trace 63. This signal degradation increases with the frequency of the signal. In addition, the fundamental and multiple harmonic frequencies that comprise a square wave undergo different phase shifts when propagating down a transmission line, i.e., dispersion occurs. These effects are exacerbated by the decreasing rise and fall times of the edges of the received square wave at, e.g., IC 51, that approximate the transmitted square wave at, e.g., IC 50. Hence the probability increases that the receiver will make a mistake in determining the logic levels of the received data.

Therefore there is a need in the high speed communication of data between IC's for an improved technique of signaling other than using binary amplitude changes on a square wave, i.e., binary digital signaling.

SUMMARY OF THE INVENTION

The present invention relates to a method and system for communicating between at least two ICs using analog signaling. The ICs are located either on the same PCB or on different PCBs having a common backplane. In addition the present invention includes analog signaling between components on an IC. The analog signaling includes amplitude, frequency, or phase modulation or any combination thereof. More specifically, a preferred embodiment uses amplitude and phase modulation, i.e., amplitude phase shift keying (APSK). An alternative embodiment uses phase shift keying (PSK)

One embodiment includes a system for communicating between two integrated circuits. The system includes, a first integrated circuit having an output circuit for converting digital data into a phase modulated signal, where the first integrated circuit is positioned on a first printed circuit board; a second integrated having an input circuit for converting the phase modulated signal back to the digital data, where the second integrated circuit is positioned on the first printed circuit board or on a second printed circuit board, wherein the second printed circuit board is connected to the first printed circuit board via a common backplane; and a connection, preferably a wired connection, for connecting the input and the output circuits.

An aspect of the present invention includes a system having a first IC having an output circuit for generating amplitude phase shift keying signals and a second IC having an input circuit for decoding the amplitude phase shift keying signals. A connection connects the output circuit and the input circuits. The output circuit contains a ring oscillator for generating multiple clock signal that are phase-locked to one another. These clock signals are selectively connected to a high voltage amplifier and a low voltage amplifier for generating output signals having different voltage levels. The selection is based on digital data of the first IC. The input circuit has a clock frequency circuit, phase and amplitude detectors, and a mapping circuit for recovering the digital data. As a result, digital bits can be transferred between integrated circuits using amplitude phase shift keying signals.

Another embodiment of the present invention includes a method for communicating between two integrated circuits. The first integrated circuit is positioned on a first printed circuit board. The second integrated circuit is positioned on the first printed circuit board or on a second printed circuit board, where the second printed circuit board is connected to the first printed circuit board via a common backplane. First, digital data from a first integrated circuit is transformed into a phase modulated signal. Next, the phase modulated signal is sent to the second integrated circuit. Lastly, the second integrated circuit recovers from the phase modulated signal the digital data.

Yet another embodiment of the present invention includes a system for communicating data between a plurality of components in an integrated circuit. The system includes a first component having an output circuit for converting digital data of the first component into a phase modulated signal; a second component having an input circuit for converting the phase modulated signal back to the digital data; and a connection in the integrated circuit for connecting the input and the output circuits.

The above summary of the present invention is not intended to describe each disclosed embodiment of the present invention. The figures and detailed description that follow provide additional example embodiments and aspects of the present invention.

DETAILED DESCRIPTION OF THE INVENTION

The present invention relates to a new communication method and system between integrated circuits and between components in an integrated circuit. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

The wire(s) or metal trace(s) between ICs on a PCB or between ICs on different PCBs connected by a backplane are transmission lines, where a transmission line may be approximately modeled by a linear system. A linear system regardless of its implementation can only effect or change the phase and/or amplitude of its input function. Hence a metal trace or wire can only delay a signal or degrade a signal's amplitude not change the signal's frequency. This suggests that frequency modulation is a better signaling method than binary digital signaling for high speed communications. In frequency modulation different logic levels are encoded using different frequencies. For example, for logic 0 and logic 1 two frequencies can be used, one for each logic level. Since the transmitted and received frequencies are the same, the problems associated with binary digital signaling over a transmission line are significantly reduced.

In addition phase modulation is also a better signaling method than binary digital signaling for high speed communications. In, for example binary PSK, logic 0 is encoded as a sinusoid of a certain frequency and logical 1 is encoded with the same sinusoid 180 degrees out of phase. Because the carrier frequency remains constant, the phase shift induced by the channel is the same regardless of the 0 or 1 being transmitted.

While analog signaling is well known, one major reason frequency or phase modulation has not been used for communication between ICs on a PCB or on different PCBs with a common backplane, is the extra circuitry that needs to be added to the IC. In light of the megahertz communication speeds and size of the circuitry needed conversion from digital data to analog signaling and back to digital data was considered impractical.

However today, with communication speeds increasing into the GHz range and above, transmission line effects are becoming a significant problem. Because there is also an ever decreasing size of the circuitry needed, the present invention's use of analog signaling between ICs is now both advantageous and practical. In addition the design of the circuitry of embodiments of the present invention is kept simple and small.

Figure 2:
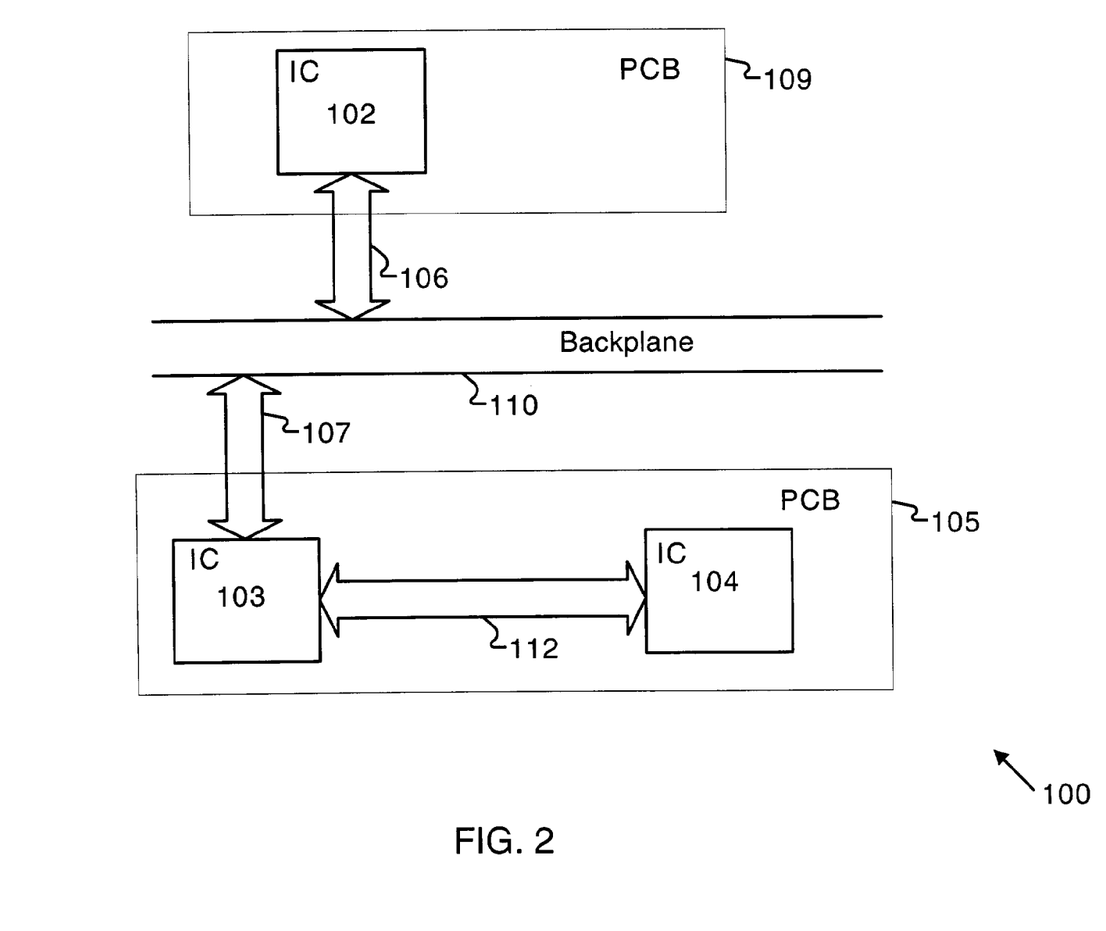
FIG. 2 is a block diagram showing a system in which an embodiment of the present invention can be used.

FIG. 2 is a block diagram showing a system 100 in which an embodiment of the present invention can be used. System 100 contains a plurality of ICs, such as ICs 102-104, that are connected directly or indirectly to each other. ICs 103 and 104 are on PCB 105 and connected by metal traces shown schematically by 112. PCB 105 is connected to IC 102 on PCB 109 via backplane 110. Examples of the ICs include field programmable gate arrays, programmable logic devices, digital signal processors, microprocessors, audio processors, video graphics processors, and applications specific integrated circuits.

In a preferred embodiment of the present invention analog signaling having amplitude or phase modulation or both is used to send digital data, e.g., bits, between IC's on the same PCB or between IC's on different PCB's having the same backplane. The analog signaling avoids some of the significant problems, e.g., signal degradation, of digital signaling as the speed and density of ICs increases. In an alternative embodiment amplitude, phase, or frequency modulation or a combination thereof are used to communicate data between ICs. In other embodiments, amplitude, phase, frequency modulation or a combination thereof, is used to communicate data between components on an IC, for example, configurable logic blocks (CLBs) in a field programmable gate array (FPGA).

Figure 3:
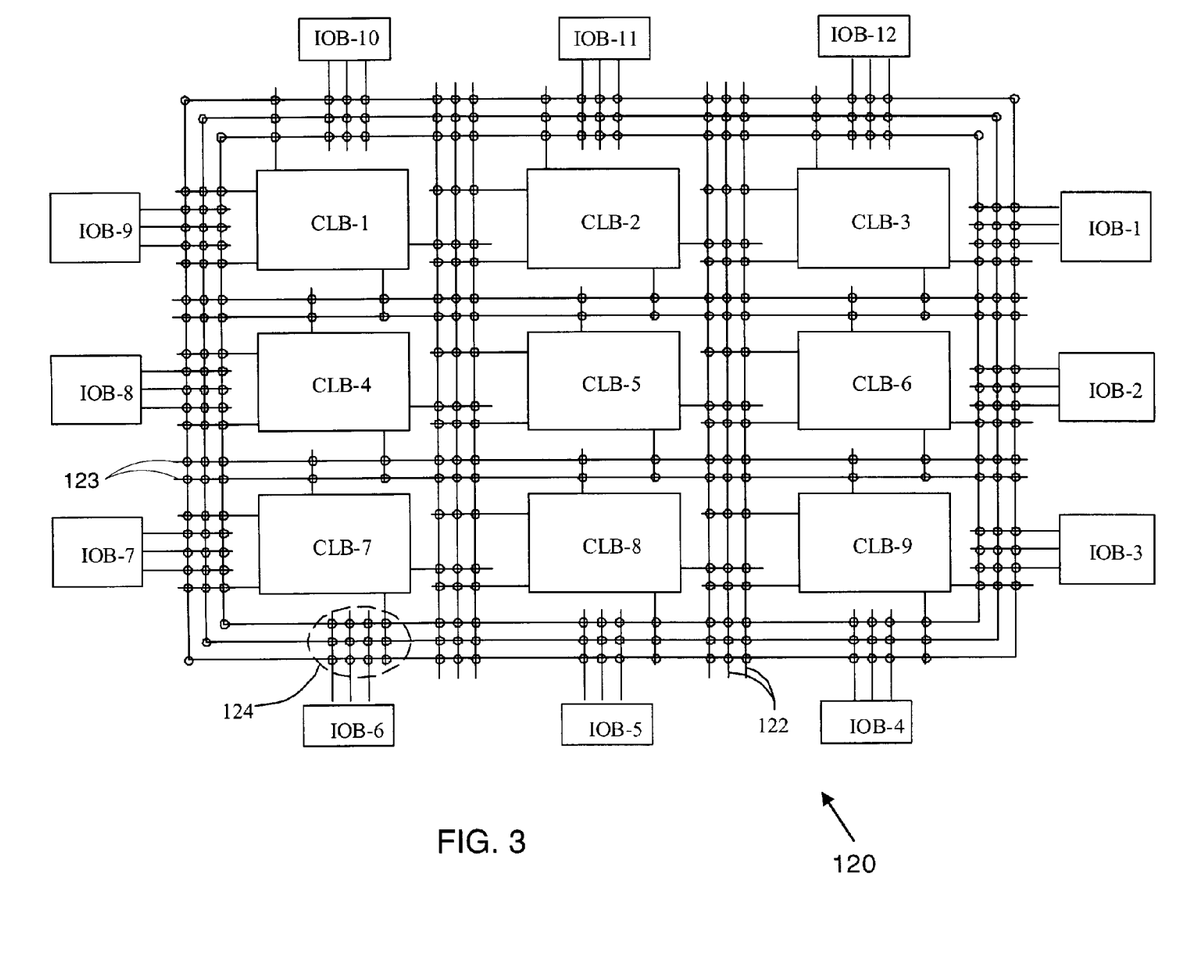
FIG. 3 shows a simplified schematic of a Field Programmable Gate Array.

FIG. 3 shows a simplified schematic of a Field Programmable Gate Array 120, which could be of one of the ICs in FIG. 2. FPGA 120 includes an array of CLBs, e.g., CLB-1 through CLB-9, that are surrounded by input/output blocks (IOBs), e.g., IOB-1 through IOB-12, and programmable interconnect resources that include vertical interconnect segments, e.g., 122, and horizontal interconnect segments, e.g., 123, extending between the rows and columns of CLBs and IOBs. Each CLB includes configurable combinational circuitry and optional registers that are programmed to implement a portion of a user's logic function. The interconnect segments of the programmable interconnect resources are configured using various switches (for example see area 124) to generate signal paths between the CLBs and between the CLBs and IOBs. Each IOB is configured to selectively utilize an associated pin (not shown) of FPGA 100 either as a device input pin, a device output pin, or a bi-directional pin. Although greatly simplified, FPGA 100 is generally consistent with FPGAs that are produced, for example, by Xilinx, Inc. of San Jose, Calif.

Figure 4:
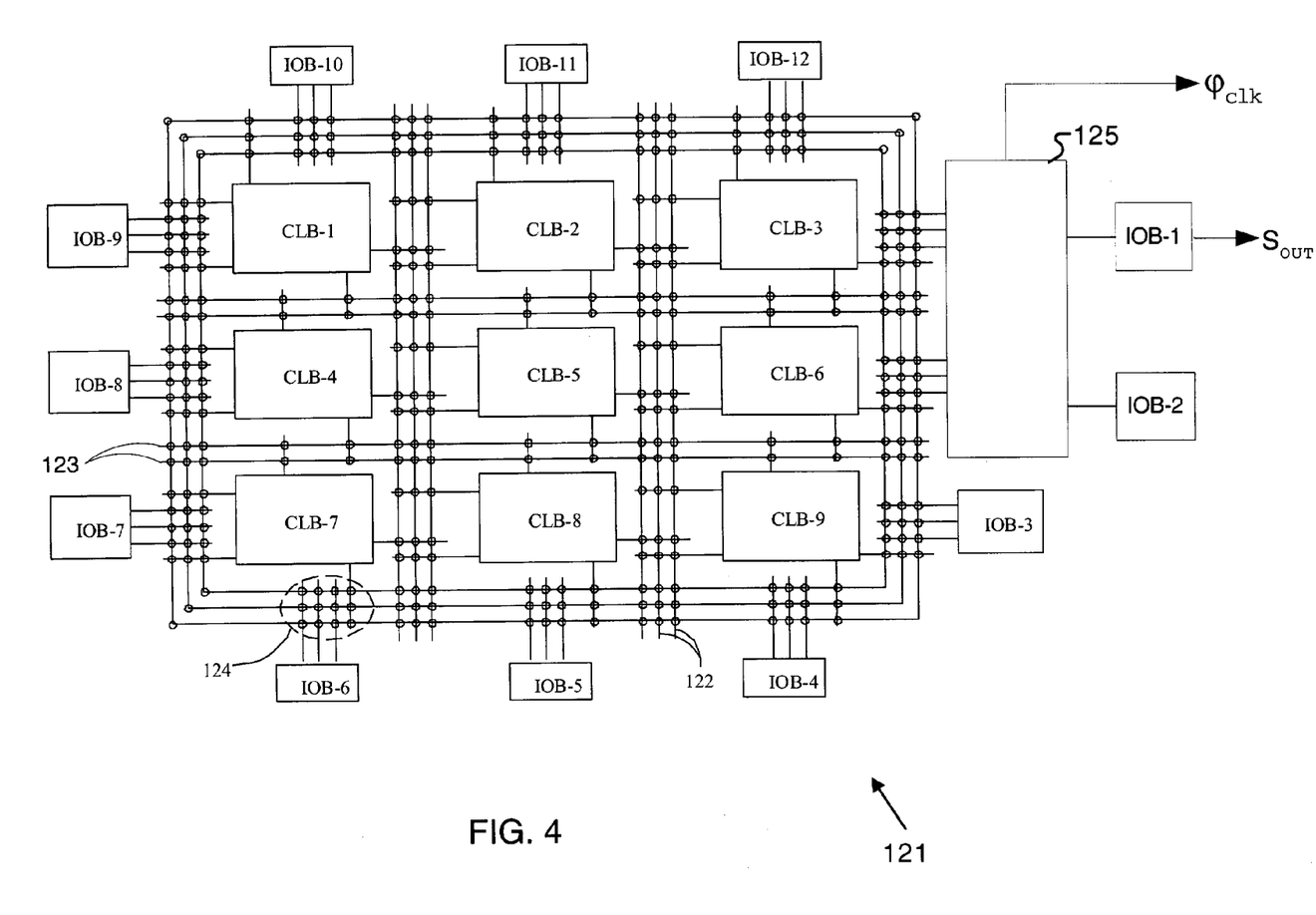
FIG. 4 is a simplified schematic of a FPGA having an transmitter circuit of an embodiment of the present invention.

FIG. 4 is a simplified schematic of a FPGA having a transmitter circuit 125 of an embodiment of the present invention. The transmitter circuit 125 has been inserted between the interconnect segments coupling, for example, CLB-3 to IOB-1, and CLB-6 to IOB-2, and the I/O buffers, IOB-1 and IOB-2. Input data into transmitter circuit 125 is digital data from the FPGA. The transmitter circuit 125 converts the input digital data, i.e., 1's and 0's into an amplitude phase shift modulation signal $S_{out}$. $S_{out}$ is sent to another IC using, for example, a metal trace.

Figure 5:
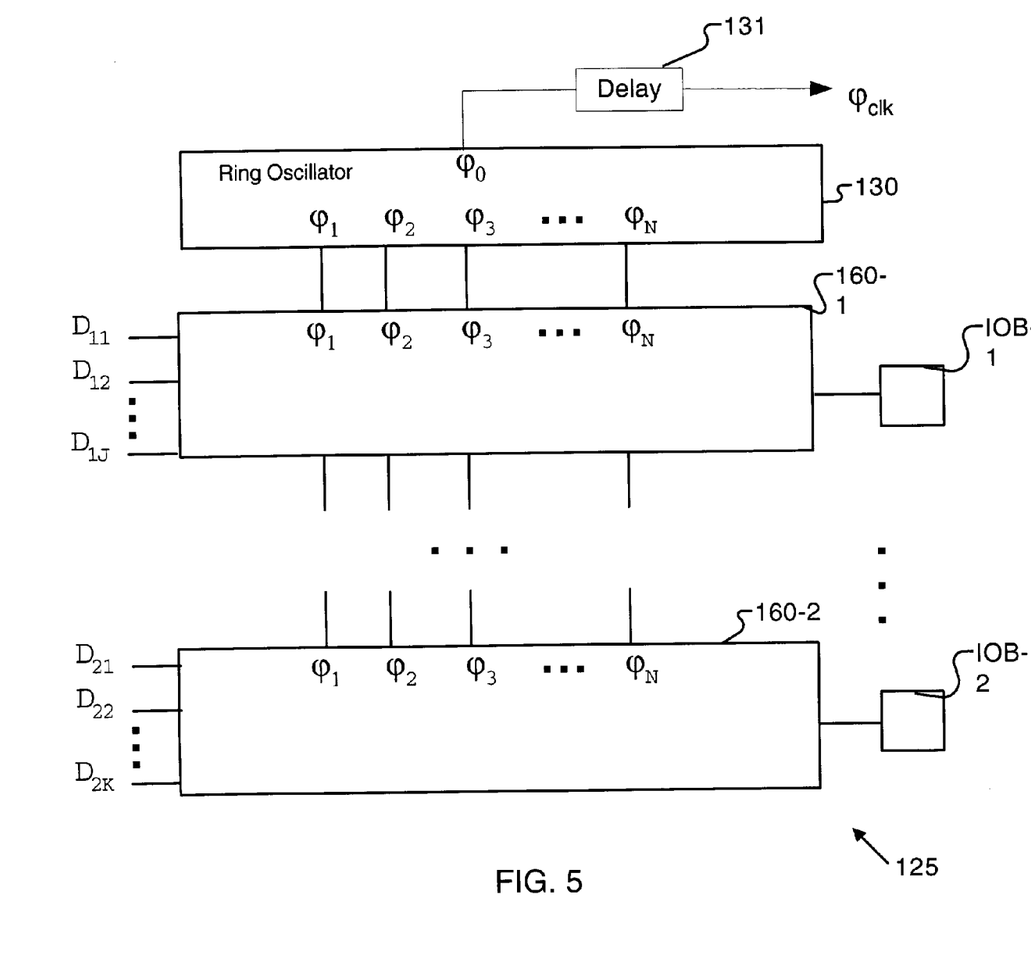
FIG. 5 is a more detail description of the transmitter circuit of FIG. 4.

FIG. 5 is a more detail description of the transmitter circuit 125 of FIG. 4. transmitter circuit 125 includes a ring oscillator 130, a delay circuit 131, and a phase encoder circuit 160-1 and an optional phase encoder circuit 160-2. Ring oscillator 130 is connected to delay circuit 131 and phase encoder circuits 160-1 and 160-2. The clock $\phi_0$ from ring oscillator 130 is time delayed by a delay circuit 131 to produce the reference clock $\phi_{clk}$ that is forwarded to the receiver circuit (see FIG. 10). The other phase shifted clocks, $\phi_1, \phi_2, \phi_3, \ldots \phi_N$, output by ring oscillator 130 are inputted by phase encoder circuits 160-1 and 160-2. Phase encoder circuit 160-1 also has digital inputs, i.e., $D_{11}$ to $D_{1j}$, which are converted to an amplitude phase shift modulation signal. The amplitude phase shift modulation signal is buffered by IOB-1 to produce $S_{out}$ (see FIG. 4). Optional phase encoder circuit 160-2 also has digital inputs, i.e., $D_{21}$ to $D_{2k}$, which are converted to an amplitude phase shift modulation signal and output from phase modulation circuit 125 via IOB-2 (not shown).

Figure 6:
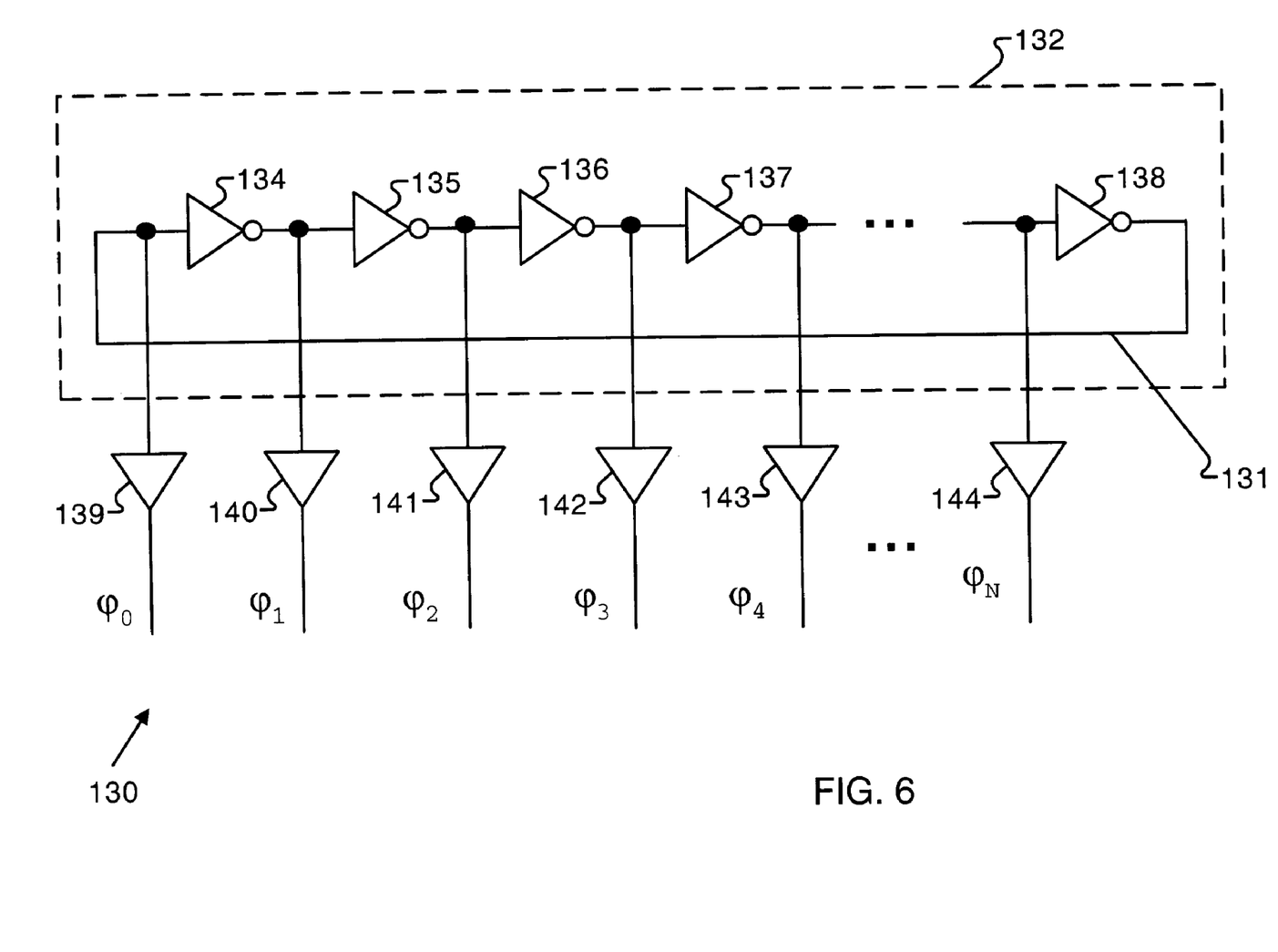
FIG. 6 is a circuit diagram for generating different phases of an embodiment of the present invention.
Figure 14:
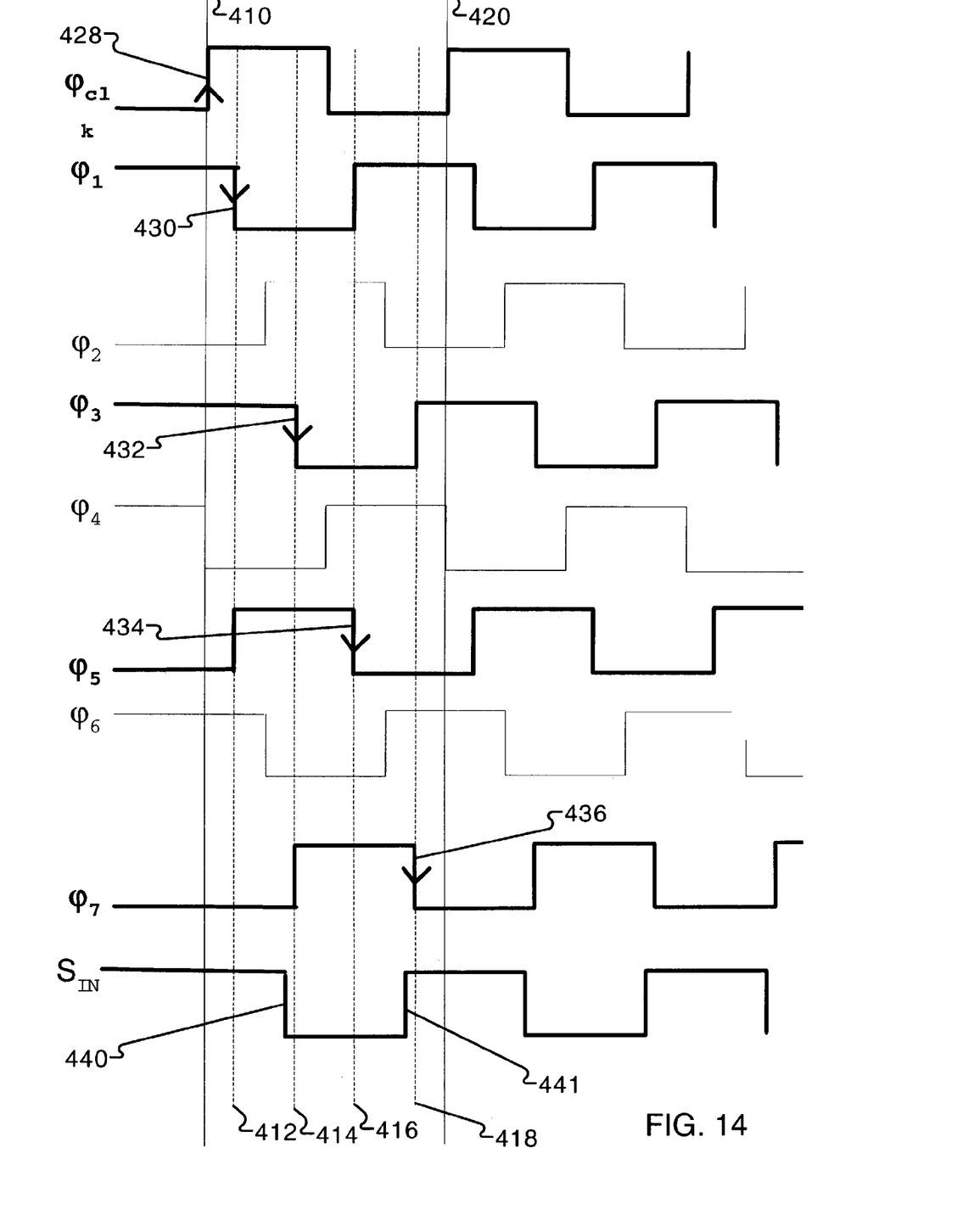
FIG. 14 is a timing diagram of the forwarded reference clock, phase shifted clocks, and received APSK signal.

FIG. 6 is a circuit diagram 130 for generating different phases of an embodiment of the present invention. Circuit diagram 130 has a ring oscillator 132 having "N" digital inverters 134-138, where N is an odd number. Output signals are tapped from the output of each or some of the inverters. The tapped signals are preferably buffered by buffers 139-144. As a result, circuit 130 generates a set of signals $\{\phi_0, \phi_1, \phi_2, \ldots, \phi_N\}$ that have the same frequency but different phases. Assuming that the inverter delay is 50 ps and the ring oscillator has five inverters, the frequency is approximately 4 GHz. FIG. 14, discussed below, shows example timing diagrams of a set of phase shifted clock signals.

Figure 7:
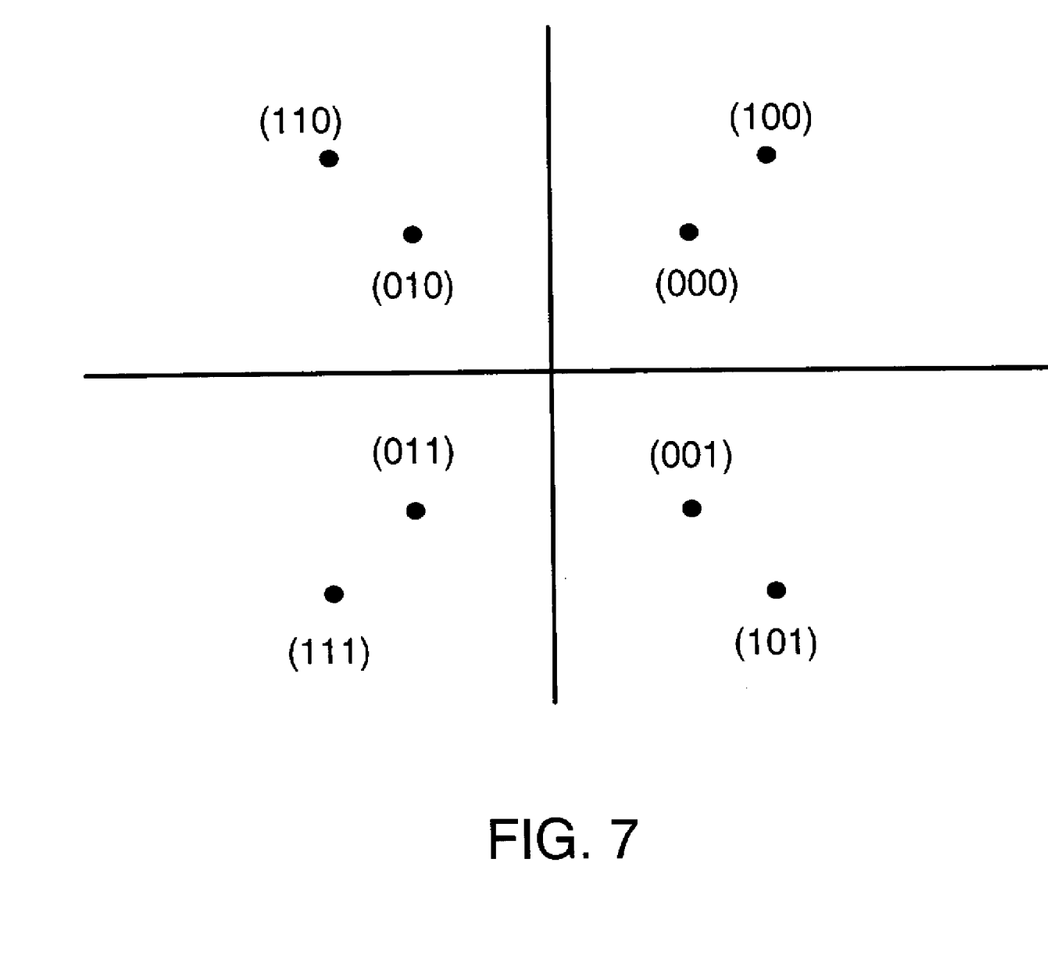
FIG. 7 shows a constellation having 3 bits per baud.

In order to illustrate the APSK system of an embodiment the present invention, an example of digital data comprising three bits, i.e., D2, D1, D0, and four phase shifted clocks $\{\phi_1, \phi_3, \phi_5, \phi_7\}$ with a phase difference of 90 degrees is used. In other embodiments one or more bits and one or more phase shifted clocks with various phase differences are used. FIG. 7 shows a constellation having 3 bits per baud. The points on the graph in FIG. 7 are labeled with the three bits (D2, D1, D0), e.g., (000) or (100), that are encoded in the output signal at that modulation point. The amplitude of the modulated signal is indicated by the distance from the origin. The phase shift of the modulated signal relative to a reference clock $\phi_0$ is indicated by the angle of the ray to the modulation point. For example the modulation point labeled by (100) has an amplitude represented by D2=1, e.g., a high voltage level, and a phase shift of 45 degrees. Another example is the modulation point labeled by (010) that has an amplitude represented by D2=0, e.g., a low voltage level, and a phase shift of 135 degrees.

Figure 8:
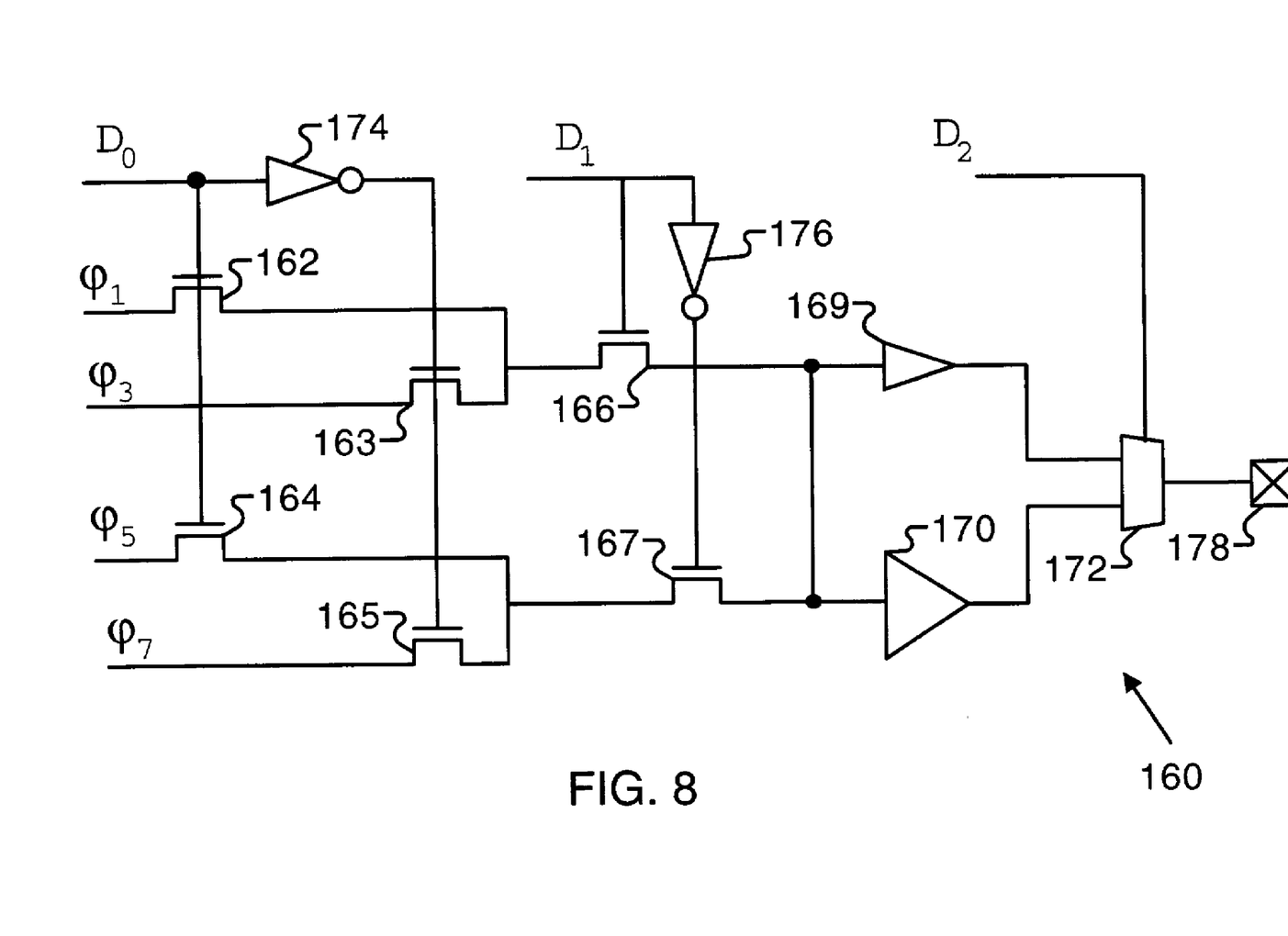
FIG. 8 is a circuit diagram of the phase encoder circuit of an embodiment of the present invention.

FIG. 8 is a circuit diagram of the phase encoder circuit 160 of an embodiment of the present invention. Phase encoder circuit 160 is used in circuits 160-1 and 160-2 of FIG. 5. Phase encoder circuit 160 comprises six transistors 162, 164, 165, 166, and 167, two amplifiers 169 and 170, two inverters 174 and 176, and a multiplexer 172. Each of the four phases $\{\phi_1, \phi_3, \phi_5, \phi_7\}$ are connected to a respective transistors 162-165. Two data lines D1 and D0 (and the appropriate inverses of D1 and D0, i.e., inverters 176 and 175, respectively) are connected to transistors 162-167 so as to select one of the four phases. The signals then pass through amplifiers 169 and 170 to provide low and high output voltages, respectively. A data line D2 is used to selectively connect (via multiplexer 172) the output of amplifiers 169 and 170 to pad 178. Pad 178 is connected to an IOB, e.g., IOB-1 or IOB-2 in FIG. 5. Hence three data bits from the IC circuit, e.g., an FGPA circuit (see FIG. 4) are converted by the phase encoder circuit 160 to an APSK signal at pad 178 having one of the four phases and one of two amplitudes as given by one of the points in the constellation of FIG. 7. (Note: the phase shifted clocks $\phi_1, \phi_3, \phi_5$, and $\phi_7$ at pad 178 are time delayed from the phase shifted clocks $\phi_1, \phi_3, \phi_5$, and $\phi_7$ input into circuit 160 by a delay amount caused by circuit 160).

The time delay across phase encoder circuit 160 is replicated by delay circuit 131 of FIG. 5. Hence the reference clock $\phi_0$ is time delayed by the same amount of $\phi_1, \phi_3, \phi_5$, and $\phi_7$.

Figure 9:
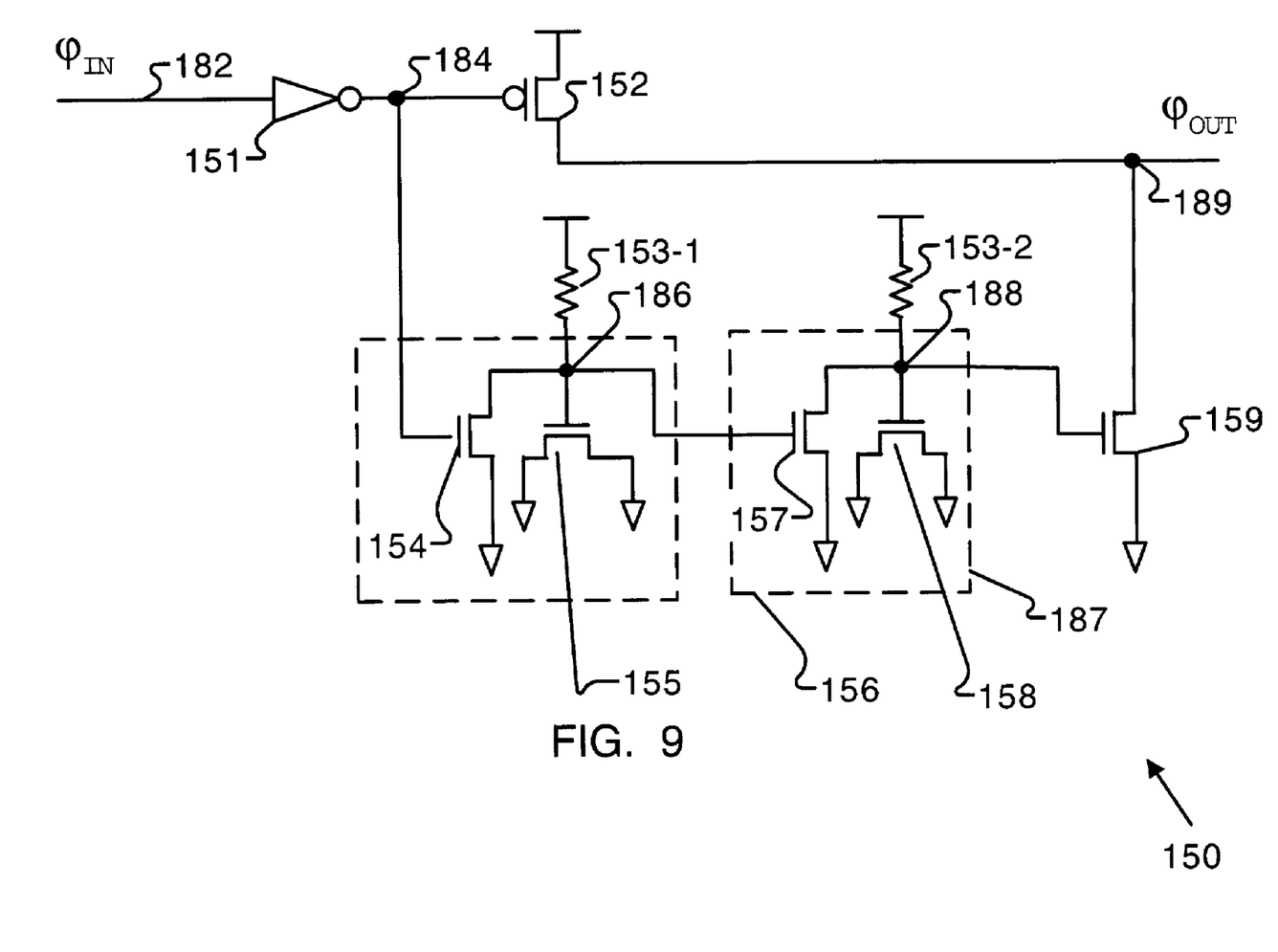
FIG. 9 shows a signal symmetry improvement circuit of an embodiment of the present invention.

The ring oscillator may generate phase shifted clock that may have undesirable asymmetrical duty cycles. Clock signals with a symmetrical duty cycle result in sinusoidal waveform as natural filtering takes place when the signals travel through the circuit paths. An asymmetrical duty cycle often introduces undesirable high frequency harmonics in the sinusoidal waveform. FIG. 9 shows a signal symmetry improvement circuit (or pulse elongation circuit) 150 that can be coupled to the output pad 178 of the phase encoder circuit 160 to increase symmetry of an embodiment of the present invention. Signal symmetry improvement circuit 150 increases the high voltage level (e.g., logical 1) portion of the clock cycle relative to the low voltage level (e.g., logical 0) portion of the clock cycle. To increase the low voltage level relative to the high voltage level of the clock cycle an analogous circuit can be used. The clock signal having asymmetric duty cycle ($\phi_{IN}$) is received by input line 182. It passes through an inverter 151, and controls a PMOS transistor 152 and an NMOS transistor 154. When node 184 is low, i.e., logical 0, PMOS transistor 152 pulls node 189 to high, i.e., $\phi_{out}$=logical 1. NMOS transistor 154 is turned off. Capacitor 155 is charged to high and turns transistor 157 on. Node 188 is pulled low and NMOS transistor 159 is turned off. PMOS transistor 152 is made large in order to have a strong pull-up to the high voltage level. When node 184 goes low, PMOS transistor 152 turns off and NMOS transistor 154 turns on. Capacitor 154 discharges and turns transistor 157 off. Capacitor 158 then charges to high turning NMOS transistor 159 on after a time delay determined by capacitors 155 and 158 and weak resistors 153-1 and 153-2. Node 189 is then pulled low, i.e., $\phi_{out}$=logical 0. Hence the time the clock signal is high has been increased. By properly selecting the capacitors and resistors, circuit 150 should produce a more symmetrical digital signal ($\phi_{OUT}$) at output line 189. In other embodiments circuit blocks similar to block 187 can be cascaded on to block 187.

The input side of a preferred embodiment of the present invention is now described. The input side, e.g., IC 51, receives the APSK signal via, for example, the metal trace 63, and decodes the amplitude and phase of the APSK signal in order to recover the digital data of the signal, e.g., (D2, D1, D0). Examples of the input side IC include a field programmable gate array, a programmable logic device, a digital signal processor, a microprocessor, an audio processor, a video graphics processor, and an applications specific integrated circuit.

Figure 10:
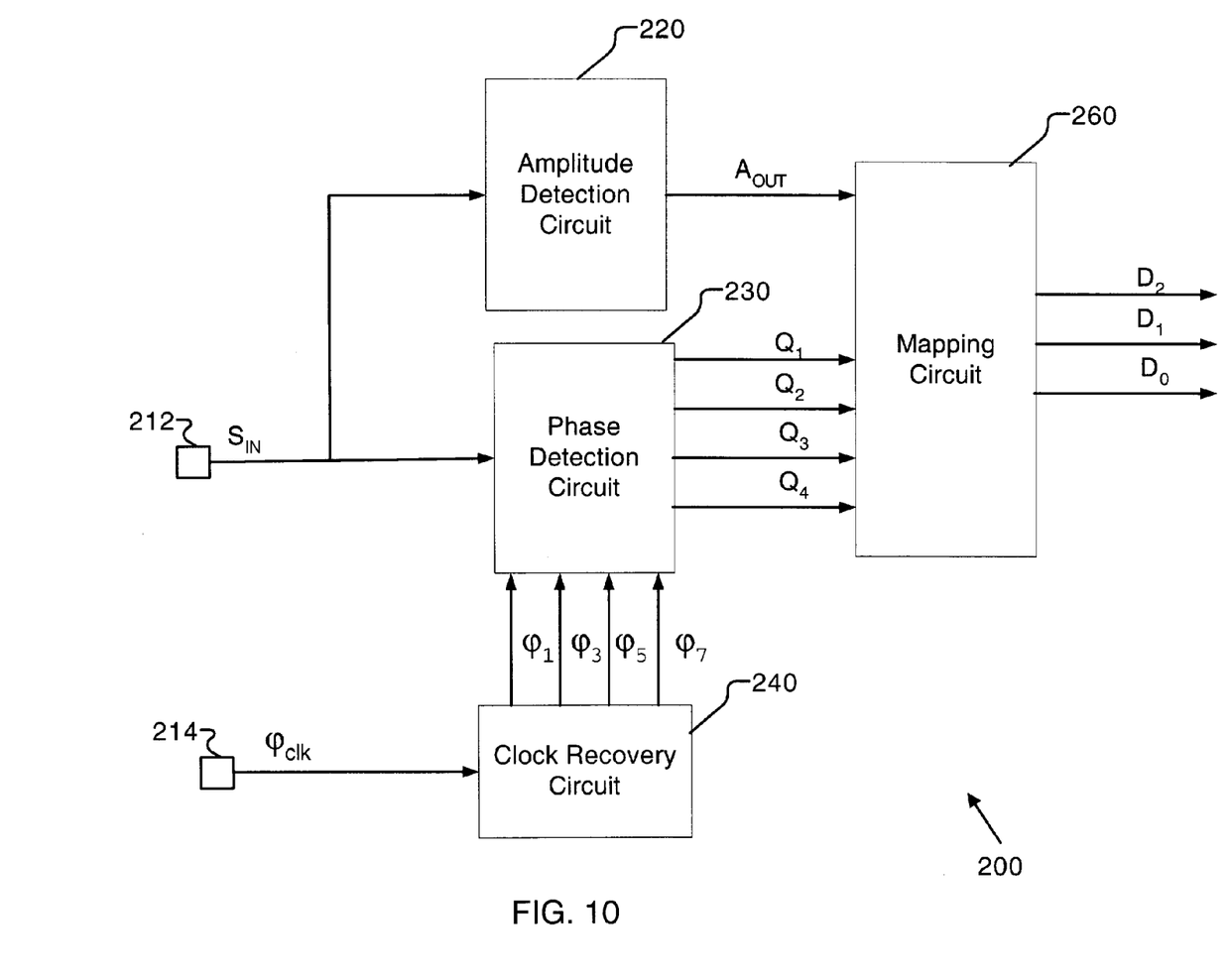
FIG. 10 is a schematic of an APSK demodulation circuit of a preferred embodiment of the present invention.

FIG. 10 is a schematic of an APSK demodulation circuit 200 of a preferred embodiment of the present invention. APSK signal $S_{IN}$ is received at input buffer 212 and proceeds to amplitude detection circuit 220 and phase detection circuit 230. The reference clock $\phi_{clk}$, i.e., the reference clock $\phi_0$ delayed and forwarded from transmitter circuit 125 of FIG. 5, is received at input buffer 214 and proceeds to clock recovery circuit 240. Clock recovery circuit 240 recovers the phase shifted clocks $\phi_1, \phi_3, \phi_5$, and $\phi_7$. The phase detection circuit 230 receives the four phase shifted clocks and decodes the encoded information from the input signal $S_{IN}$ to produce a 4 bit output (Q4, Q3, Q2, Q1), that indicates which one of the phase shifted clocks $\phi_1, \phi_3, \phi_5$, and $\phi_7$, is in $S_{IN}$ during one cycle of $\phi_{clk}$. Concurrently, amplitude detection circuit 220 decodes the amplitude from the input signal $S_{IN}$ and produces a one bit output $A_{out}$ that has a value 1 for a high voltage amplitude and a 0 for a low voltage amplitude. The mapping circuit 206 the receives $A_{out}$ and (Q4, Q3, Q2, Q1) and uses a combinational logic circuit implementation of a table to map the inputs, ($A_{out}$, Q4, Q3, Q2, Q1) to the three bit digital data (D2, D1, D0).

Figure 11:
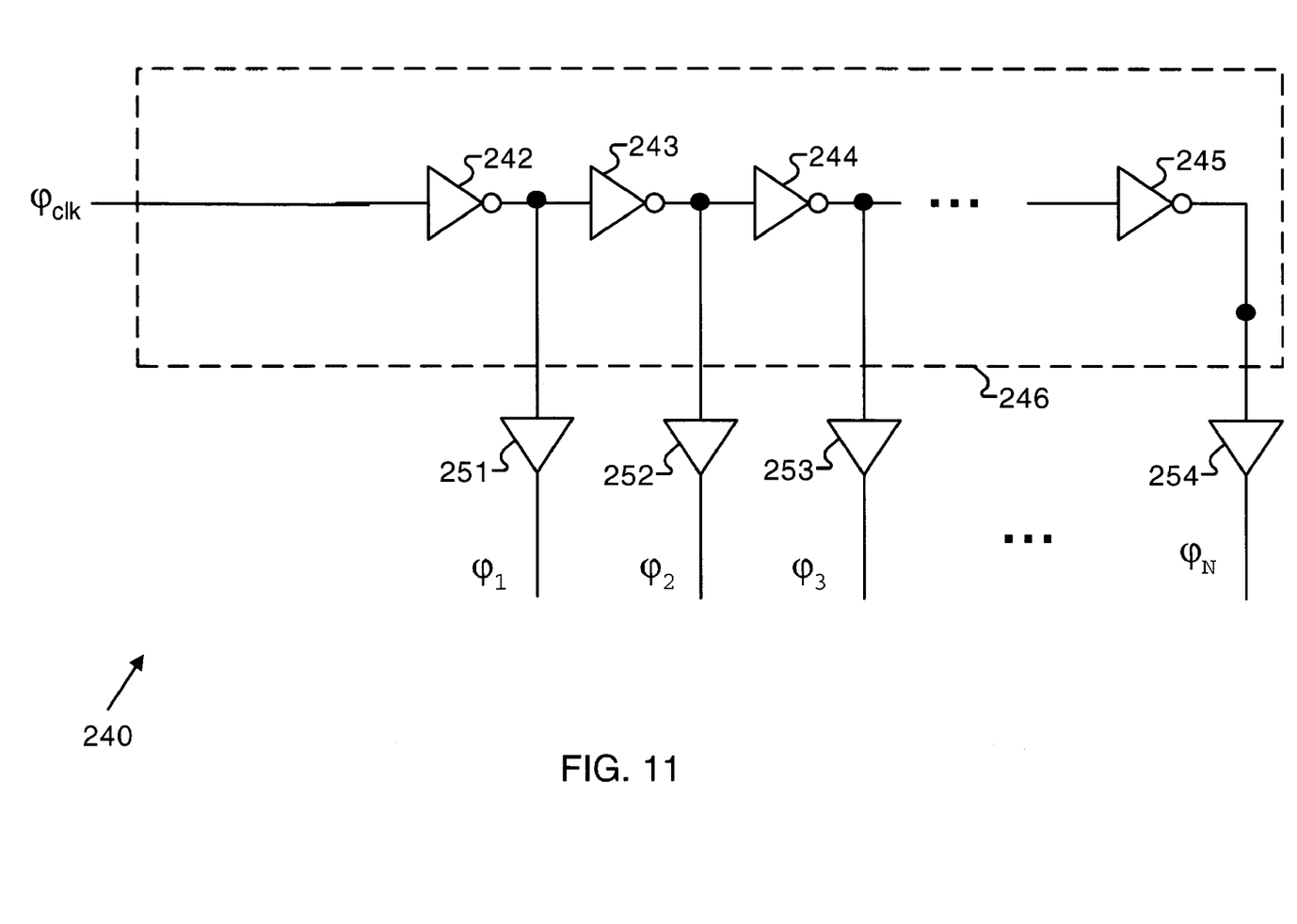
FIG. 11 is a circuit diagram of the clock recovery circuit in FIG. 10.

FIG. 11 is a circuit diagram of the clock recovery circuit 240 in FIG. 10. Clock recovery circuit 240 receives the forwarded reference clock $\phi_{clk}$ and recovers each of the phase shifted clocks ($\phi_1, \phi_2, \phi_4, \ldots \phi_N$). The circuit 246 includes N inverters, e.g., 242-245, connected in series. The output to each inverter may be optionally buffered with buffers, e.g., 251-254, to produce the phase shifted output signals ($\phi_1, \phi_2, \phi_4, \ldots \phi_N$). The circuit 240 in FIG. 11 is similar to the circuit 130 of FIG. 6 except the feedback loop 131 is absent.

Figure 12:
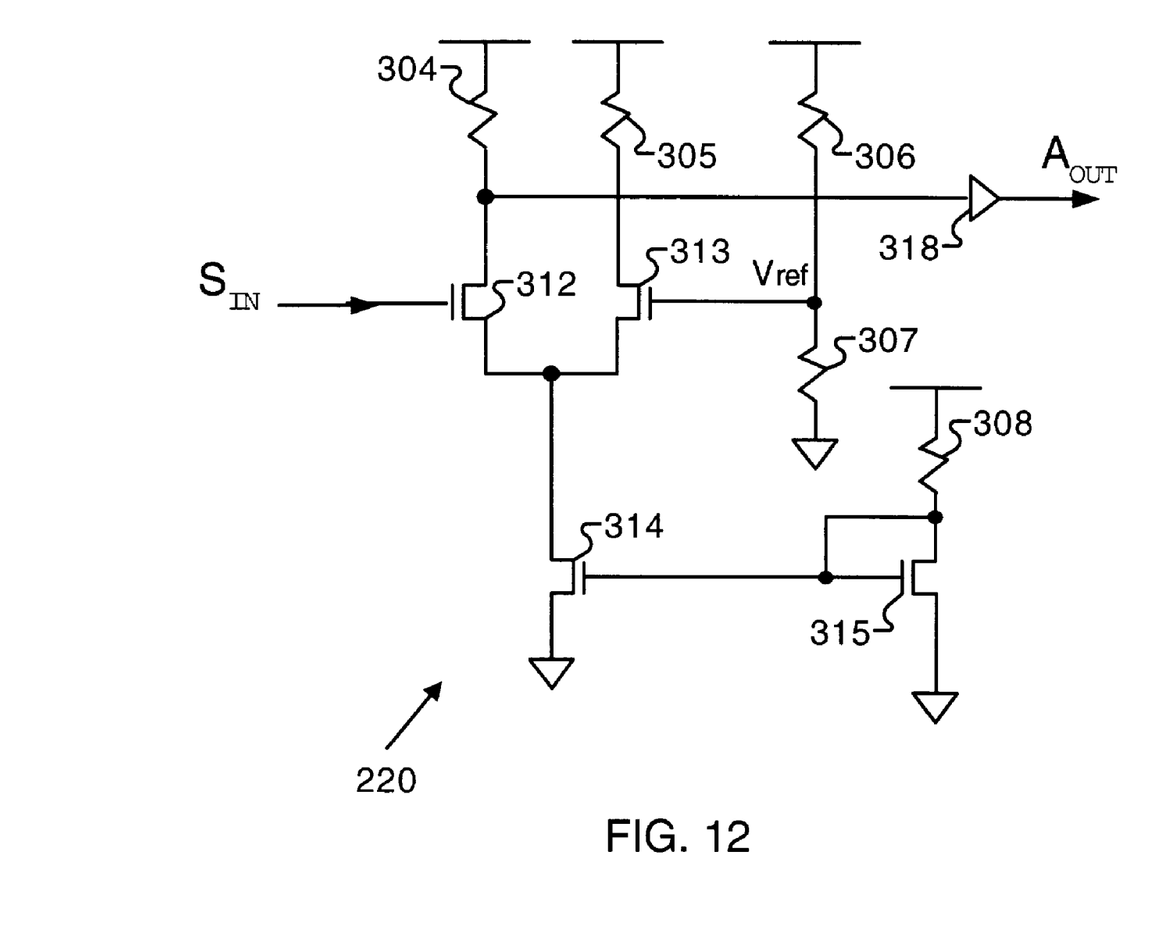
FIG. 12 shows a circuit diagram of the amplitude detection circuit in FIG. 10.

FIG. 12 shows a circuit diagram of the amplitude detection circuit 220 in FIG. 10. It comprises five resistors 304-308 and four transistors 312-315. Amplitude detection circuit 220 receives amplitude phase shifted signal $S_{IN}$ at the gate of transistor 312. Transistor pair 312 and 313 functions as a differential amplifier, and compares the voltage level of $S_{IN}$ to $V_{ref}$ (generated by resistor pair 306 and 307). $V_{ref}$ is set to a value such that the default current path is through transistor 313. Output voltage $A_{OUT}$ has a low voltage level when $S_{IN}$ has a higher voltage than $V_{ref}$ and a high voltage level otherwise. A buffer 318 is used to sharpen edges and improve drive capacity.

Figure 13:
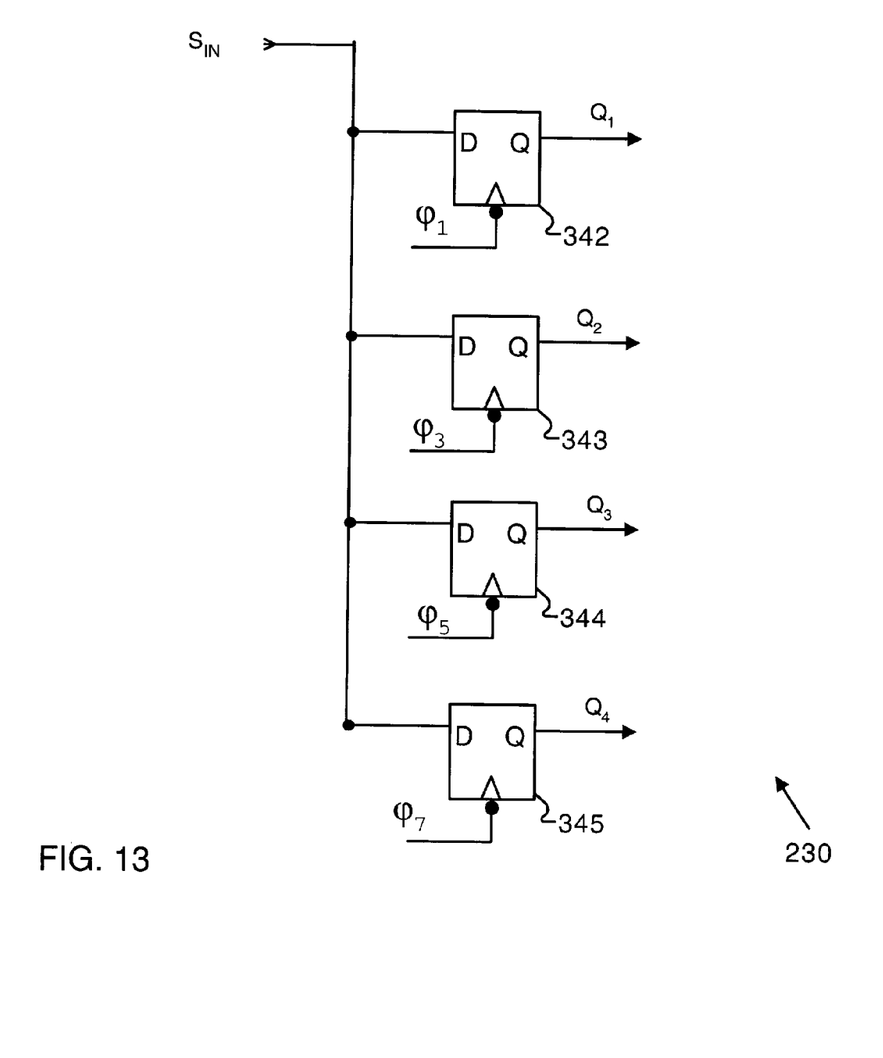
FIG. 13 is a circuit diagram of the phase detection circuit of FIG. 10.

FIG. 13 is a circuit diagram of the phase detection circuit 230 of FIG. 10. It comprises a plurality of falling edge triggered flip-flops, such as flip-flops 342-345. The D input of these flip flops is connected to $S_{IN}$ and the Q output is low when the D input is low. The clock input of each flip-flops is connected to the output of clock recovery circuit 240, i.e. one of the phase shifted clocks $\phi_1, \phi_3, \phi_5,$ and $\phi_7$. During one clock cycle of $\phi_{clk}$, $S_{IN}$ has one of the four phase shifted clocks $\phi_1, \phi_3, \phi_5,$ and $\phi_7$. Assuming the clock recovery circuit 240 introduces a small delay to the phase shifted clocks, $S_{IN}$ occurs a little before the falling edge of $\phi_1, \phi_3, \phi_5,$ and $\phi_7$ (for example see edge 440 of $S_{IN}$ compared to edge 432 of $\phi_3$ in FIG. 14). Hence one or more of the flip-flops may have their outputs (Q4, Q3, Q2, Q1) equal to one when, $S_{IN}$ has one of the four phase shifted clocks $\phi_1, \phi_3, \phi_5,$ and $\phi_7$.

The outputs of phase detection 230 and amplitude detection circuit 220 can be used to recover the original digital input bits. Table 1 shows the relationship between the values of two decoded bits (D1 and D0) and the outputs (Q0 to Q4) of phase detector circuit 230, and the value of the decoded amplitude bit D2 and the output Aout of the amplitude detection circuit 260. A total of three decoded bits (corresponding to eight different values) are recovered.

TABLE 1

| $A_{out}$ | $Q_1$ | $Q_2$ | $Q_3$ | $Q_4$ | $D_2$ | $D_1$ | $D_0$ |
|---|---|---|---|---|---|---|---|
| 1 | 0 | 0 | 1 | 1 | 0 | 1 | 1 |
| 1 | 1 | 0 | 0 | 1 | 0 | 1 | 0 |
| 1 | 1 | 1 | 0 | 0 | 0 | 0 | 1 |
| 1 | 1 | 1 | 1 | 0 | 0 | 0 | 0 |
| 0 | 0 | 0 | 1 | 1 | 1 | 1 | 1 |
| 0 | 1 | 0 | 0 | 1 | 1 | 1 | 0 |
| 0 | 1 | 1 | 0 | 0 | 1 | 0 | 1 |
| 0 | 1 | 1 | 1 | 0 | 1 | 0 | 0 |

Mapping circuit 260 of FIG. 10 is a combinational logic implementation of Table 1. The combinational logic implementation is well known to one of ordinary skill in the arts and is not included so as not to obscure the invention.

FIG. 14 is a timing diagram of the forwarded reference clock $\phi_{clk}$, phase shifted clocks ($\phi_1, \phi_2, \phi_4, \ldots \phi_N$), and the received APSK signal, $S_{IN}$. One cycle of the reference clock $\phi_{clk}$, is shown between vertical lines 410 and 420 and has rising edge 428. The falling edges of phase shifted clocks ($\phi_1, \phi_3, \phi_5,$ and $\phi_7$) in one cycle of clock $\phi_{clk}$ are shown by 430, 432, 434, and 436, respectively (also shown by vertical dotted lines 412, 414, 416, and 418, respectively). When $S_{IN}$ is modulated by phase shifted clock $\phi_3$, $S_{IN}$ has falling edge 440 and rising edge 441 and the falling edges of phase shifted clocks $\phi_3$ and $\phi_5$, i.e., falling edges 432 and 434, latch one into the outputs of flip-flops 343 and 344 making Q2 and Q3 low.

The use of three digital input bits (D2, D1, D0), and APSK using 4 modulation phases and 2 amplitudes, was for illustration purposes and other embodiments have various other combinations of digital input bits, modulation phases, and amplitudes. Also while data is illustrated as going from a sender IC to a receiver IC, this was for ease of explanation only. It is well understood that an IC can send and receive data and that an I/O buffer on an IC may have bi-directional data transfer.

An alternative embodiment of the present invention uses PSK. For example, to represent two bits (D1, D0), the four phase shifted clocks ($\phi_1, \phi_3, \phi_5,$ and $\phi_7$) are used with one amplitude. The phase encoder circuit 160 of FIG. 8 can be modified by removing amplifier 169 and multiplexer 172 and having the output of amplifier 170 go directly to pad 178. On the input side, circuit 200 of FIG. 10 can be used without the amplitude detection circuit 220. The top half of Table 1 ($A_{out}$=0) is used for the mapping circuit 260.

In addition, looking at the FPGA in FIG. 5, similar APSK or PSK signaling, as described above, can be used between different components, e.g., CLBs, within an IC. For example CLB-1 can convert its digital data to an APSK signal using a circuit similar to FIG. 5. The APSK signal is sent to CLB-9 on one of the interconnection paths in FPGA 120. CLB-9 using circuitry similar to that shown in FIG. 10, decodes the APSK signal to recover the original digital data from CLB 1. Because circuitry on an IC is increasingly more and more dense, using the encoding/modulation and the decoding/demodulation circuitry, as given above, adds only a small amount of circuitry.

It can be seen from the above description that a novel communication system has been disclosed. Those having skill in the relevant arts of the invention will now perceive various modifications and additions, which may be made as a result of the disclosure herein. Accordingly, all such modifications and additions are deemed to be within the scope of the invention, which is to be limited only by the appended claims and their equivalents.

The invention claimed is:

1. A system for communicating between two integrated circuits, comprising:
    a first integrated circuit having an output circuit for converting digital data into a phase modulated analog signal, the first integrated circuit positioned on a first printed circuit board; and
    a second integrated having an input circuit for converting the phase modulated analog signal back to the digital data, the second integrated circuit positioned on the first printed circuit board or on a second printed circuit board, wherein the second printed circuit board is connected to the first printed circuit board via a common backplane;
    wherein the phase modulated analog signal comprises an amplitude phase shift keying signal;
    wherein the output circuit comprises:
        a ring oscillator for generating a plurality of phase shifted clock signals; and
        a converter circuit for receiving the digital data and at least one of the plurality of phase shifted clock signals and for generating the amplitude phase shift keying signal, the converter circuit including:

a switch for passing through a signal of the plurality of phase shifted clock signals when a first bit of the digital data is asserted;
an amplifier connected to the switch for amplifying the signal; and
a multiplexer connected to the amplifier for selecting an amplitude of a plurality of amplitudes for the signal, the multiplexer controlled by a second bit of the digital data.

2. The system of claim 1 wherein the switch comprises an NMOS transistor.

3. The system of claim 1 wherein a signal of the plurality of phase shifted clock signals generated by the ring oscillator has an asymmetrical duty cycle corrected by a signal symmetry improvement circuit.

4. The system of clam 1 wherein the amplitude detection circuit comprises a differential amplifier.

5. The system of claim 1 wherein the clock recovery circuit comprises a plurality of inverters connected in series.

6. The system of claim 1 wherein the first integrated circuit is selected from the group consisting of a field programmable gate array, a programmable logic device, digital signal processor, a microprocessor, an audio processor, a video graphics processor, and an applications specific integrated circuit.

7. A method for communicating between two integrated circuits, comprising:
transforming digital data from a first integrated circuit into a phase modulated analog signal, the first integrated circuit positioned on a first printed circuit board;
sending the phase modulated analog signal to a second integrated circuit, the second integrated circuit positioned on the first printed circuit board or on a second printed circuit board, wherein the second printed circuit board is connected to the first printed circuit board via a common backplane; and
recovering the digital data from the phase modulated analog signal at the second integrated circuit;
wherein the transforming comprises:
generating a plurality of phase shifted clock signals;
passing through a signal of the plurality of phase shifted clock signals when a first bit of the digital data is asserted;
amplifying the signal; and
selecting an amplitude of a plurality of amplitudes for the signal in response to a second bit of the digital data.

8. The method of claim 7 wherein the phase modulated analog signal includes amplitude modulation, wherein the amplitude modulation is determined from at least one bit of the digital data.

9. The method of claim 8 wherein the recovering comprises detecting an amplitude of the phase modulated analog signal.

10. The method of claim 7 further comprising forwarding a reference clock signal from the first integrated clock to the second integrated circuit.

11. The method of claim 10 wherein the recovering comprises:
receiving the reference clock signal;
demodulating the phase modulated analog signal to produce a plurality of intermediary bits using the reference clock signal; and
mapping the plurality of intermediary bits to the digital data.

12. The method of claim 11 wherein demodulating the phase modulated analog signal comprises:
using the reference clock signal to generate a plurality of phase shifted clock signals; and
storing a value of the phase modulated analog signal when a phase shifted clock signal of the plurality of phase shifted clock signals changes.

13. The method of claim 7 further comprising generating a plurality of phase shifted clock signals by a ring oscillator for use in transforming digital data from the first integrated circuit into the phase modulated analog signal.

14. A system for communicating data between a plurality of components in an integrated circuit, comprising:
a first component of the plurality of components having an output circuit for converting digital data of the first component into a phase modulated analog signal;
a second component of the plurality of components having an input circuit for converting the phase modulated analog signal back to the digital data; and
a connection in the integrated circuit for connecting the input and the output circuits;
wherein the output circuit comprises:
a ring oscillator for generating a plurality of phase shifted clock signals; and
a converter circuit for receiving the digital data and at least one of the plurality of phase shifted clock signals and for generating the phase modulated analog, the converter circuit including:
a switch for passing through a signal of the plurality of phase shifted clock signals when a first bit of the digital data is asserted;
an amplifier connected to the switch for amplifying the signal; and
a multiplexer connected to the amplifier for selecting an amplitude of a plurality of amplitudes for the signal, the multiplexer controlled by a second bit of the digital data.

15. The system of claim 14 wherein a component of the plurality of components includes a configurable logic block (CLB) or an input/output block (IOB) of a field programmable gate array (FPGA).

16. The system of claim 14 further comprising a clock recovery circuit having a plurality of inverters connected in series for generating the plurality of phase shifted clock signals.

17. The system of claim 1, wherein the input circuit comprises:
an amplitude detection circuit for determining an indication of amplitude of a plurality of amplitudes of an amplitude phase shift keying signal;
a clock recovery circuit configured to receive a clock signal and configured to generate a phase shifted clock signal;
a phase detection circuit, comprising a plurality of flip-flops, wherein a flip-flop of the plurality of flip-flops stores an indication of a phase of the amplitude phase shift keying signal, when the phase shifted clock signal changes; and
a mapping circuit, comprising digital logic, receiving the indication of amplitude and the indication of the phase and generating at least one bit of the digital data.

18. The system of claim 14, wherein the input circuit comprises:
a phase detection circuit, comprising a plurality of flip-flops, wherein a flip-flop of the plurality of flip-flops stores an indication of a phased shifted clock signals changes; and
a mapping circuit, comprising digital logic, receiving the indication of the phase and generating a bit of the digital data.

* * * * *